United States Patent [19]
Kober et al.

[11] 3,884,952
[45] May 20, 1975

[54] VAPOR PHASE PROCESS FOR PREPARING HALOGENATED ISOCYANATES

[75] Inventors: Ehrenfried H. Kober, Kraiburg, Upper Bavaria, Germany; Richard H. Martin, Brevard, N.C.; Maurice A. Raymond, Northford, Conn.

[73] Assignee: Olin Corporation, New Haven, Conn.

[22] Filed: Apr. 5, 1973

[21] Appl. No.: 348,442

Related U.S. Application Data

[63] Continuation-in-part of Ser. No. 53,652, July 9, 1970, abandoned.

[52] U.S. Cl. .......... 260/453 PC; 252/441; 252/472; 260/243 A; 260/471 R
[51] Int. Cl. .......................................... C07c 119/04
[58] Field of Search .............................. 260/453 PC

[56] References Cited
UNITED STATES PATENTS
3,481,968   12/1969   Ottmann et al. .................... 260/453

*Primary Examiner*—Lewis Gotts
*Assistant Examiner*—Dolph H. Torrence
*Attorney, Agent, or Firm*—Thomas P. O'Day; Robert L. Andersen

[57] ABSTRACT

A continuous vapor phase process for preparing halogenated aromatic isocyanates comprising reacting vaporized aromatic nitro compound with gaseous carbon monoxide in the presence of a halogen donating gas and an active palladium catalyst.

10 Claims, No Drawings

VAPOR PHASE PROCESS FOR PREPARING HALOGENATED ISOCYANATES

This application is a continuation-in-part of copending application Ser. No. 53,652 filed July 9, 1970 and now abandoned.

This invention relates to a process for preparing halogenated organic isocyanates from the corresponding organic nitro compounds in a vapor phase reaction.

Halogenated organic isocyanates have been used extensively in the preparation of urethane foams and coatings having flame-retardant properties as well as in the preparation of insecticides, pesticides and the like.

The usual commercial process for preparing halogenated organic isocyanates is very complex and expensive. The process requires the catalytic hydrogenation of an organic nitro compound to form the corresponding amine, followed by reaction of the amine with phosgene to form the corresponding isocyanate, which then, in an additional step, has to be halogenated. Halogenated organic isocyanates can also be prepared by phosgenation of chlorinated amines. A suitable technique for halogenating organic amines is disclosed in U.S. Pat. No. 3,236,887, issued Feb. 22, 1966, to Haywood Hooks, Jr. and Gerhard F. Ottmann.

Still another method for preparing halogenated isocyanates is to halogenate organic nitro compounds, which then have to be hydrogenated to halogenated amines and which then have to be reacted with phosgene to form halogenated isocyanates. However, catalytic hydrogenation of halogenated nitro compounds is often accompanied by partial replacement of halogen by hydrogen atoms and thus results in low yield of the desired halogenated amines. Although the loss of halogen can be avoided when nitro compounds are chemically reduced to halogenated amines, this method is economically not attractive, and both catalytic hydrogenation and chemical reduction of chlorinated nitro compounds require a multiplicity of steps in order to produce halogenated isocyanates.

Another method for preparing halogenated isocyanates is disclosed in U.S. Pat. No. 3,481,968, issued Dec. 2, 1969 to Gerhard F. Ottmann, Ehrenfried H. Kober and David F. Gavin wherein reaction of aromatic nitro compounds, carbon monoxide and halogenated inorganic oxides in a liquid system under pressure resulted in the formation of halogenated aromatic isocyanates. While this method is more direct and more economical than those previously mentioned it still requires the use of increased pressure conditions.

Disadvantages inherent in the liquid phase reactions for the preparation of halogenated aromatic isocyanates include the following:

1. Leaching of catalyst by the liquid components may cause a relatively high catalyst loss.
2. Solvents must be separated and recycled.
3. High concentration of reactants causes undesirable side reactions.
4. Catalyst must be separated from the liquid reaction products and recovered.
5. High pressure equipment is necessary.

While preparation of halogenated aromatic isocyanates using a liquid system is known as defined above, the preparation of halogenated aromatic isocyanates in a vapor phase reaction was heretofore unknown. This is probably due to the fact that it is fairly difficult to successfully perform a vapor phase reaction of this type and moreover, the operating conditions such as temperature, pressure and particularly the catalyst system must be clearly and specifically defined.

It is an object of this invention to provide a simple economic process for preparing halogenated aromatic isocyanates from aromatic nitro compounds.

It is a further object of this invention to provide an improved process for preparing halogenated aromatic isocyanates from aromatic nitro compounds.

It is a further object of this invention to provide an improved process for preparing halogenated aromatic isocyanates from the corresponding aromatic nitro compounds in a vapor phase reaction.

These and other objects of this invention will be apparent from the following detailed description.

It has now been discovered that the above-mentioned objects are accomplished in a continuous process wherein a vaporized aromatic nitro compound is reacted with gaseous carbon monoxide in the presence of a halogen donating gas and an active palladium catalyst, and a gaseous stream containing halogenated aromatic isocyanates is removed from the reaction zone.

Some of the advantages resulting from the use of the novel vapor phase technique of this invention for preparing halogenated organic isocyanates include the following:

1. Solvents are unnecessary
2. Low pressure equipment may be employed
3. Low catalyst loss
4. Undesirable side reactions are minimized due to the high ratio of CO to organic nitro compound
5. Catalyst separation is instantaneous.

In carrying out the method of this invention any aromatic nitro compound capable of being converted to a halogenated aromatic isocyanate may be employed as a reactant. As used herein, the term "aromatic nitro compound," represents those organic compounds having at least one nitro group attached directly to an aromatic nucleus such as benzene, naphthalene and the like, wherein the aromatic nucleus may also contain other substituents as illustrated below. Among the preferred organic nitro compounds which may be used in the practice of this invention are the nitrobenzenes, both mono- and polynitro, including isomeric mixtures thereof; the alkylnitrobenzenes, including the various nitrated toluenes and the nitrated xylenes; nitrated biphenyl and nitrated diphenylmethanes. Other preferred reactants include bis(nitrophenoxy)alkanes and bis(nitrophenoxy) alkylene ethers. Typical examples of suitable aromatic nitro compounds which can be reacted to form halogenated isocyanates include the following:

a. Nitrobenzene
b. Nitronaphthalenes
c. Nitroanthracenes
d. Nitrobiphenyls
e. Bis(nitrophenyl)methanes
f. Bis(nitrophenyl)thioethers
g. Bis(nitrophenyl)ethers
h. Bis(nitrophenyl)sulfones
i. Nitrodiphenoxy alkanes
j. Nitrophenothiazines All of the aforementioned compounds may be substituted with one or more additional substituents such as nitro, alkyl, alkoxy, aryloxy, halogen, alkylthio, arylthio, carboxyalkyl, cyano, isocyanato, and the like, and employed as reactants in the novel process of this invention. Specific examples of suitable substituted-nitro compounds which can be used are as follows:

1. o-Nitrotoluene
2. m-Nitrotoluene
3. p-Nitrotoluene
4. o-Nitro-p-xylene
5. 2-Methyl-1-nitronaphthalene
6. m-Dinitrobenzene
7. p-Dinitrobenzene
8. 2,4-Dinitrotoluene
9. 2,6-Dinitrotoluene
10. Dinitromesitylene
11. 4,4'-Dinitrobiphenyl
12. 2,4-Dinitrobiphenyl
13. 4,4'-Dinitrobibenzyl
14. Bis(p-nitrophenyl)methane
15. Bis(2,4-dinitrophenyl)methane
16. Bis(p-nitrophenyl)ether
17. Bis(2,4-dinitrophenyl)ether
18. Bis(p-nitrophenyl)thioether
19. Bis(p-nitrophenyl)sulfone
20. Bis(p-nitrophenoxy)ethane
21. Bis(p-nitrophenoxy)diethylene ether
22. 2,4,6-Trinitrotoluene
23. 1,3,5-Trinitrobenzene
24. 1-Chloro-2-nitrobenzene
25. 1-Chloro-4-nitrobenzene
26. 1-Chloro-3-nitrobenzene
27. Nitrodiphenyl methane
28. 2-Chloro-6-nitrotoluene
29. 4-Chloro-3-nitrotoluene
30. 1-Chloro-2,4-dinitrobenzene
31. 1,4-Dichloro-2-nitrobenzene
32. α-Chloro-p-nitrotoluene
33. 1,3,5-Trichloro-2-nitrobenzene
34. 1,3,5-Trichloro-2,4-dinitrobenzene
35. 1,2-Dichloro-4-nitrobenzene
36. α-Chloro-m-nitrotoluene
37. 1,2,4-Trichloro-5-nitrobenzene
38. 1-Bromo-4-nitrobenzene
39. 1-Bromo-2-nitrobenzene
40. 1-Bromo-3-nitrobenzene
41. 1-Bromo-2,4-dinitrobenzene
42. α,α-Dibromo-p-nitrotoluene
43. α-Bromo-p-nitrotoluene
44. 1-Fluoro-4-nitrobenzene
45. 1-Fluoro-2,4-dinitrobenzene
46. 1-Fluoro-2-nitrobenzene
47. o-Nitrophenyl isocyanate
48. m-Nitrophenyl isocyanate
49. p-Nitrophenyl isocyanate
50. o-Nitroanisole
51. p-Nitroanisole
52. p-Nitrophenetole
53. o-Nitrophenetole
54. 2,4-Dinitrophenetole
55. 2,4-Dinitroanisole
56. 1-Chloro-2,4-dimethoxy-5-nitrobenzene
57. 1,4-Dimethoxy-2-nitrobenzene
58. m-Nitrobenzaldehyde
59. p-Nitrobenzaldehyde
60. p-Nitrobenzoylchloride
61. m-Nitrobenzoylchloride
62. 3,5-Dinitrobenzoylchloride
63. Ethyl p-nitrobenzoate
64. Methyl o-nitrobenzoate
65. m-Nitrobenzenesulfonylchloride
66. p-Nitrobenzenesulfonylchloride
67. o-Nitrobenzenesulfonylchloride
68. 4-Chloro-3-nitrobenzenesulfonylchloride
69. 2,4-Dinitrobenzenesulfonylchloride
70. 3-Nitrophthalic anhydride
71. p-Nitrobenzonitrile
72. m-Nitrobenzonitrile
73. 3,3'-Dimethoxy-4,4-dinitro-biphenyl
74. 3,3'-Dimethyl-4,4'-dinitro-biphenyl
75. 2-Isocyanato-4-nitrotoluene
76. 4-Isocyanato-2-nitrotoluene In addition, isomers and mixtures of the aforesaid aromatic nitro compounds and substituted aromatic nitro compounds may also be employed, as well as homologues and other related compounds. Generally, the aromatic compounds and substituted aromatic nitro compounds contain between about 6 and about 14 carbon atoms.

The halogen donating gases which may be used include any halogen containing gas which is capable of effecting the transformation of an organic nitro compound to a halogenated organic isocyanate in accordance with this invention and more particularly the halogen gases, inorganic halide gases and halogenated inorganic oxide gases. Among the preferred gases are the halogens, sulfur halides and their oxides, carbon and nitrogen halides and their oxides and the hydrohalides. Illustrative of the gases which may be employed are the following: chlorine, bromine, fluorine, iodine, thionyl chloride ($SOCl_2$), thionyl bromide ($SOBr_2$), thionyl fluoride ($SOF_2$), thionyl iodide ($SOI_2$), sulfuryl chloride ($SO_2Cl_2$), sulfuryl bromide ($SO_2Br_2$), sulfuryl fluoride ($SO_2F_2$), sulfuryl iodide ($SO_2I_2$), sulfur dichloride ($SCl_2$), sulfur dibromide ($SBr_2$), sulfur chloride ($S_2Cl_2$), sulfur bromide ($S_2Br_2$), sulfur fluoride ($S_2F_2$), sulfur iodide ($S_2I_2$), hydrogen chloride (HCl), hydrogen bromide (HBr), hydrogen iodide (HI), hydrogen fluoride (HF), phosgene ($COCl_2$), carbon oxybromide ($COBr_2$), carbon oxyfluoride ($COF_2$), nitrogen oxychloride (NOCl), nitrogen oxybromide (NOBr), nitrogen oxyfluoride (NOF), nitroxyl chloride ($NO_2Cl$), nitroxyl fluoride ($NO_2F$) and nitrosotribromide ($NOBr_3$).

Catalysts which may be used in the method of this invention include the palladium halides and oxides. Illustrative of these compounds are the following: palladium chloride ($PdCl_2$), palladium bromide ($PdBr_2$), palladium fluoride ($PdF_2$), palladium iodide ($PdI_2$), palladium suboxide ($Pd_2O$), palladium monoxide (PdO) and palladium dioxide ($PdO_2$).

In addition to the active catalyst described above, a co-catalyst may be used. The desired co-catalyst may be a halide of copper, molybdenum, rhodium and ruthenium or an oxide of molybdenum. Included in this group of co-catalysts are: cupric chloride ($CuCl_2$), cupric bromide ($CuBr_2$), cuprous iodide ($CuI_2$), cuprous fluoride ($CuF_2$), molybdenum dibromide ($MoBr_2$), molybdenum dichloride ($MoCl_2$), rhodium chloride ($RhCl_3$), rhodium fluoride ($RhF_3$), ruthenium dichloride ($RuCl_2$), molybdenum sesquioxide ($Mo_2O_3$), molybdenum dioxide ($MoO_2$) and molybdenum trioxide ($MoO_3$).

The catalyst system can be self-supported or deposited on a support or carrier for dispersing the catalyst system to increase its effective surface. Alumina, silica, silicon carbide, carbon, barium sulfate, calcium carbonate, asbestos, bentonite, diatomaceous earth, fuller's earth, and analogous materials are useful as carriers for this purpose.

The proportion of halogen donating gas admixed with the aromatic nitro compound depends on the number of halogen atoms to be introduced into the aromatic ring and is generally equivalent to a molar proportion of halogen donating gas to each nitro group in the aromatic nitro compound in the range between about 0.1:1 and about 10:1, preferably in the range between about 0.2:1 and about 8:1 and more preferably in the range between about 0.5:1 and about 3:1.

Generally the amount of carbon monoxide employed is not particularly critical with the amount present being at least sufficient to provide reactant for the process. The total amount of carbon monoxide added during the reaction is generally between about 3 and about 100 and preferably between about 5 and about 15 moles of carbon monoxide per nitro group in the aromatic nitro compound. Greater or lesser amounts may be employed if desired. The highest carbon monoxide requirements are generally utilized in a process in which the carbon monoxide is added continuously, but suitable recycle of the carbon monoxide containing gas stream greatly reduces the overall consumption of carbon monoxide.

The proportion of catalyst system is generally in the range between about 0.01 and about 100, and preferably between about 0.1 and about 20 percent by weight of the aromatic nitro compound. However, greater or lesser proportions may be employed if desired.

When using a co-catalyst, the weight ratio of co-catalyst to active catalyst is generally in the range between about 0.001:1 and about 25:1 and preferably in the range between about 0.05:1 and about 10:1 but greater or lesser amounts may be employed if desired.

The novel process of this invention can be carried out in any suitable apparatus adapted for vapor phase reactions. In one embodiment of this invention, means are provided for conveying the aromatic nitro compound to a vaporizer where the liquid reactant is heated to form a gas or vapor, and the resulting vapor is then fed into the bottom of a vertical tube reactor, preferably after passing the vapor through a heat exchanger or preheater. The carbon monoxide reactant is also preferably preheated to an elevated temperature prior to being fed into the reactor.

The vertical tube reactor is provided with suitable means for maintaining the temperature in the reactor within the desired range. The reaction temperature will vary depending generally upon the boiling point of the nitro compound, the support catalyst and the isocyanate product. The operating temperature is generally in the range from about 100° to about 500°C., preferably from about 200° to about 450°C. and more preferably from about 275° to about 325°C.

The vertical reaction tube is partially or completely filled with the catalyst in a form which permits passage of the gaseous reaction mixture without causing an unnecessarily high pressure drop across the catalyst bed. The catalyst in the vertical reaction tube may be of the fixed bed type, the fluidized bed type, or any other convenient form. In one embodiment, the catalyst is supported on glass beads or silicon carbide beads, which may be continuously withdrawn and regenerated without the need for stopping the continuous process.

The gaseous aromatic nitro compound and carbon monoxide gas may be premixed, generally by premixing in any suitable mixing nozzle and fed into the vertical reaction tube for passage through the catalyst bed. If desired, the two gaseous streams may be mixed at the bottom of the reactor tube in a suitable nozzle, or may be fed individually into the reactor tube or the catalyst bed. Best results are generally obtained when the two gaseous streams are premixed prior to passing through the catalyst bed.

The halogen donating gas may be added to the reactor individually but it is preferable to mix it with a portion of carbon monoxide prior to being fed into the reactor.

The reaction product in gaseous form is withdrawn from the top of the vertical reaction tube, or any other convenient point, passed through suitable traps and condensers, and the resulting liquid phase which contains the reaction product is collected. The gas phase from the condensers may contain a substantial portion of carbon monoxide and aromatic nitro compound along with carbon dioxide. If desired, this gas stream may be recycled to the vaporizer, or may be further treated to recover unreacted aromatic nitro compound and carbon monoxide for further reaction.

One advantage of the process of this invention is that it can be carried out at atmospheric pressure thus eliminating the need for highly expensive equipment that is necessary in liquid phase reactions of this type. If desired, somewhat higher or lower pressures may be employed but it is preferred to use pressures of up to about atmospheric pressure.

Halogenated aromatic isocyanates produced in accordance with the technique of this invention are suitable for use in preparing flame-retardant urethane compounds such as foams, coatings, fibers, and the like by reacting the halogenated aromatic isocyanate with a suitable polyether polyol in the presence of a catalyst and if desired a foaming agent, and as intermediates for biologically active compounds.

The following examples are presented to further illustrate the invention without any intention of being limited thereby.

EXAMPLE I

A vertical reactor tube 36 inches long with an inside diameter of approximately 0.8 inch was charged to a depth of about 6 inches with pyrex glass beads to permit final preheating and the remainder was filled with a catalyst system made up of 5% $PdCl_2$ and 5% $CuCl_2$ supported on 4–8 mesh SiC (total weight 168grams).

The catalyst bed was purged with preheated dry nitrogen at reaction temperature (~300°C.) for 1 hour prior to reaction to purge off any remaining water and adsorbed gases (e.g., $O_2$).

Nitrobenzene was charged to a vaporizer and maintained at 164°C. resulting in a nitrobenzene vapor pressure of approximately 200 torr. A preheated (165°C.) flow of carbon monoxide was passed through the vaporizer, entraining nitrobenzene vapors at the saturation vapor pressure of 200 torr and subsequently passed through a heat exchanger at 250°C. and then to an injection nozzle at the bottom of the reactor tube. The vaporizer to heat exchanger connecting tube and heat exchanger to injection nozzle connector were maintained at temperatures of 180° and 300°C. respectively.

A second gas line leading directly to the heat exchanger and then to the injection nozzle at the bottom of the reactor tube was connected through suitable conduits and valves such that an admixture of carbon monoxide gas and HCl gas could be fed into the reactor.

The injection nozzle was fabricated with 180° opposed dual inlets to promote mixing of the gases from the two lines described above.

The gases were run through the reactor for one hour with a total flow of 210 cc/min. made up of 100 cc/min. of carbon monoxide and nitrobenzene (mole ratio of $CO:C_6H_5NO_2$ of 6:1) through one line and 100 cc/min. of carbon monoxide plus 10 cc/min. of HCl through the other line.

During the course of the reaction, the average reactor temperature was 300°C. with the temperature being controlled by a proportional temperature controller and three individually adjustable zone heaters. Reaction temperature was monitored at the respective centers of the top, middle and bottom reactor zones by calibrated thermocouples, which were inserted in a 0.25 inch O.D. thermocouple well extending down the center of the reactor tube.

The reactor tube was provided with an outlet at the top, which was connected to suitable traps and condensers for collection of reaction product.

The reaction was run under atmospheric pressure and after the 1 hour reaction period, the carbon monoxide, nitrobenzene and hydrogen chloride gas feeds were shut off and dry nitrogen again passed through the reactor for an additional 30 minutes. This desorbed any unreacted nitrobenzene and products on the catalyst bed.

Infrared analysis of the trapped reactor effluent indicated ~5 percent isocyanate. Subsequent vapor phase chromatographic analysis indicated a small amount of phenyl isocyanate and several high boiling peaks identifiable as isomer mixtures of dichloro- and tirchlorophenyl isocyanates.

EXAMPLE II

The same procedure as used in Example I was followed with the reactant feeds being 100 cc/min. of carbon monoxide and nitrobenzene (mole ratio of $CO:C_6H_5NO_2$ of 6:1) through one line and 100 cc/min. of carbon monoxide plus 10 cc/min. of $Cl_2$ through the other line.

Following reaction for 1 hour, dry nitrogen gas was passed through the reactor for 20 minutes.

Infrared analysis of the trapped reactor effluent indicated ~3 percent isocyanate. Subsequent vapor phase chromatographic analysis indicated a trace of phenyl isocyanates and several high boiling peaks identifiable as isomer mixtures of dichloro- and trichlorophenyl isocyanates.

Various modifications of the invention, some of which have been referred to above, may be employed without departing from the spirit of the invention.

What is claimed is:

1. A continuous vapor phase process for preparing a halogenated aromatic isocyanate from the corresponding aromatic nitro compound, which comprises:
   a. vaporizing an aromatic nitro compound containing between about 6 and about 14 carbon atoms
   b. reacting the resulting vapor with gaseous carbon monoxide
   c. in the presence of a halogen donating gas selected from the group consisting of chlorine, bromine, fluorine, iodine, thionyl chloride, thionyl bromide, thionyl fluoride, thionyl iodide, sulfuryl chloride, sulfuryl bromide, sulfuryl fluoride, sulfuryl iodide, sulfur dichloride, sulfur dibromide, sulfur chloride, sulfur bromide, sulfur fluoride, sulfur iodide, hydrogen chloride, hydrogen bromide, hydrogen iodide, hydrogen fluoride, phosgene, carbon oxybromide, carbon oxyfluoride, nitrogen oxychloride, nitrogen oxybromide, nitrogen oxyfluoride, nitroxyl chloride, nitroxyl fluoride and nitrosotribromide and
   d. an active catalyst selected from the group consisting of palladium halides and palladium oxides
   e. in a reaction zone at a temperature from about 100° to about 500°C. and at a pressure of up to about atmospheric pressure and
   f. withdrawing the reaction product containing the halogenated aromatic isocyanate from said reaction zone.

2. The process of claim 1 wherein said halogen donating gas is selected from the group consisting of HCl and $Cl_2$.

3. The process of claim 2 wherein said aromatic nitro compound is nitrobenzene.

4. The process of claim 1 wherein the molar proportion of halogen donating gas to each nitro group in said aromatic nitro compound is in the range of from about 0.1:1 to about 10:1.

5. The process of claim 4 wherein said temperature is from about 200° to about 450°C.

6. The process of claim 5 wherein a co-catalyst selected from the group consisting of halides of copper, molybdenum, rhodium and ruthenium and the oxides of molybdenum is used.

7. The process of claim 6 wherein the aromatic nitro compound is nitrobenzene and the halogen donating gas is HCl.

8. The process of claim 6 wherein the aromatic nitro compound is nitrobenzene and the halogen donating gas is $Cl_2$.

9. The process of claim 4 where said temperature is from about 275° to about 325°C.

10. The process of claim 9 wherein said aromatic nitro compound is nitrobenzene and the halogen donating gas is selected from the group consisting of HCl and $Cl_2$.

* * * * *